US009395079B2

(12) United States Patent
Satoh et al.

(10) Patent No.: US 9,395,079 B2
(45) Date of Patent: Jul. 19, 2016

(54) COMBUSTION HEATER (75) Inventors: Kimiyoshi Satoh, Yokohama (JP); Hidenari Baba, Yokohama (JP); Masao Aihara, Tokyo (JP); Toshiyuki Suda, Tokyo (JP); Toshiro Fujimori, Yokohama (JP)

(73) Assignee: IHI CORPORATION (JP)

( * ) Notice: Subject to any disclaimer, the term of this patent is extended or adjusted under 35 U.S.C. 154(b) by 648 days.

(21) Appl. No.: 13/878,628

(22) PCT Filed: Nov. 4, 2011

(86) PCT No.: PCT/JP2011/075424
§ 371 (c)(1),
(2), (4) Date: Apr. 10, 2013

(87) PCT Pub. No.: WO2012/060437
PCT Pub. Date: May 10, 2012

(65) Prior Publication Data
US 2013/0192591 A1 Aug. 1, 2013

(30) Foreign Application Priority Data
Nov. 4, 2010 (JP) ................................. 2010-247370

(51) Int. Cl.
F23D 14/12 (2006.01)
F23D 3/00 (2006.01)
F23D 14/66 (2006.01)

(52) U.S. Cl.
CPC ........ *F23D 14/12* (2013.01); *F23D 3/00* (2013.01); *F23D 14/66* (2013.01);
(Continued)

(58) Field of Classification Search
CPC ........... F23C 3/00; F23D 14/12; F23D 14/66; F23D 2900/14001; F23D 2213/00; F23D 2900/00003; F23D 2211/00
See application file for complete search history.

(56) References Cited

U.S. PATENT DOCUMENTS 3,228,614 A 1/1966 K. E. Bauer
6,461,149 B1 10/2002 Ahmady

FOREIGN PATENT DOCUMENTS

CN 2394103 8/2000
CN 101849139 9/2010
(Continued)

OTHER PUBLICATIONS

First Office Action dated Sep. 25, 2014 issued in corresponding Chinese Patent Application No. 201180051883.3 with English translation.
(Continued)

*Primary Examiner* — Alfred Basichas
(74) *Attorney, Agent, or Firm* — Ostrolenk Faber LLP (57) ABSTRACT

Provided is a combustion heater (100), which includes a heating plate (118), a layout plate (120) disposed opposite to the heating plate, an annular outer circumferential wall (122) interposed between the heating plate and the layout plate, clipping parts (136) configured to sandwich the heating plate, the layout plate, and the outer circumferential wall so that at least one of the heating plate and the layout plate is allowed to expand in an extending direction thereof, a partition plate (124) disposed between the heating plate and the layout plate, a combustion chamber (126) disposed inside the outer circumferential wall along the outer circumferential wall, an inflow passage (128) configured to flow fuel gas into the combustion chamber using the layout plate and the partition plate as a lateral wall thereof, and an outflow passage (130) configured to discharge exhaust gas from the combustion chamber to an outside using the heating plate and the partition plate as a lateral wall thereof, and to preheat the fuel gas using heat of the exhaust gas via the partition plate. According to the combustion heater, thermal fatigue caused by repetition of heating and cooling can be suppressed.

7 Claims, 8 Drawing Sheets (52) U.S. Cl.
CPC ........ *F23D 2211/00* (2013.01); *F23D 2213/00* (2013.01); *F23D 2900/00003* (2013.01); *F23D 2900/14001* (2013.01)

(56) References Cited

FOREIGN PATENT DOCUMENTS

| CN | 201568969 U | 9/2010 |
|---|---|---|
| GB | 2183024 A | 5/1987 |
| JP | 2001-165412 | 6/2001 |
| JP | 2001-330215 | 11/2001 |
| JP | 2004-020083 | 1/2004 |
| JP | 2004-324925 | 11/2004 |
| JP | 2005-076973 | 3/2005 |
| JP | 2007-155221 | 6/2007 |
| JP | 2007-212081 | 8/2007 |
| JP | 2007-212082 | 8/2007 |
| TW | 201033546 A1 | 9/2010 |

OTHER PUBLICATIONS

Notice of Allowance dated Jun. 17, 2014 issued in corresponding Japanese Patent Application No. 2010-247370 with English translation.

International Search Report and Written Opinion mailed Nov. 29, 2011 in corresponding PCT International Application No. PCT/JP2011/075424.

Taiwanese Office Action, dated Jan. 21, 2014, issued in corresponding Taiwan Patent Application No. 100140079. English translation. Total 9 pages.

Korean Notice of Allowance, dated Mar. 19, 2014, issued in corresponding Korean Patent Application No. 10-2013-7009630. English translation. Total 3 pages.

COMBUSTION HEATER

CROSS-REFERENCE TO RELATED APPLICATIONS

The present application is a 35 U.S.C. §§371 national phase conversion of PCT/JP2011/075424, filed Nov. 4, 2011, which claims priority to Japanese Patent Application No. 2010-247370, filed Nov. 4, 2010, the contents of which are incorporated herein by reference. The PCT International Application was published in the Japanese language.

FIELD OF THE INVENTION

The present invention relates to a combustion heater burning fuel to heat a heating target.

BACKGROUND ART

Conventionally, combustion heaters that heat a radiating body with combustion heat generated by combustion of fuel gas and heat an industrial material or food with radiant heat from a radiating surface of the radiating body have been widely used. In such combustion heaters, for example, to increase radiant intensity, a technology of applying a high-emissivity material or shape to the radiating surface has been proposed (e.g., see Patent Document 1).

Further, a combustion heater known as a micro combustor for improving heat efficiency has been proposed. This combustion heater increases heat efficiency by forming a range from an inflow passage of fuel gas to a combustion chamber and an outflow passage of exhaust gas after combustion in a sealed structure, making the inflow and outflow passages adjacent to each other, and preheating the fuel gas prior to combustion with heat of the exhaust gas (e.g., see Patent Document 2).

RELATED ART DOCUMENTS

Patent Documents

[Patent Document 1] Japanese Unexamined Patent Application Publication No. 2004-324925
[Patent Document 2] Japanese Unexamined Patent Application Publication No. 2007-212082

DISCLOSURE OF THE INVENTION

Problems to be Solved by the Invention

In the conventional combustion heater in Patent Document 1 as described above, the fuel gas is burnt at a fuel gas outlet formed in a surface of the radiating surface, and the exhaust gas is exhausted to the surroundings without being recovered. Thus, exhaust heat cannot be recovered, and heat efficiency is reduced. Further, since an area of the radiating surface is reduced by the formation of the fuel gas outlet, it is difficult to improve radiant intensity. Furthermore, the temperature around the apparatus is raised by the heat of the exhaust gas, or the exhaust gas is permeated around the apparatus. As such, there is a need to take sufficient care to improve the surrounding environment.

On the other hand, since the combustion heater in Patent Document 2 recovers spent exhaust gas and uses the heat of the exhaust gas to preheat the fuel gas, the surrounding environment does not easily deteriorate, and the heat efficiency is high. Further, since there is no need to form a fuel gas outlet on the radiating surface, the area of the radiating surface can be increased, and the radiant intensity is also high. Such a combustion heater becomes a sealed structure for making efficient use of the heat of the exhaust gas and recovering the exhaust gas itself as well. For example, in the case of a disc-type combustion heater, there is a need to seal between a heating plate having the radiating surface, an outer circumferential wall, and a layout plate disposed opposite to the heating plate having the radiating surface, which constitute a body container of the combustion heater, so that gas does not leak out.

However, thermal expansion caused by the combustion heat generates stress at the heating plate, the layout plate, and the outer circumferential wall. For this reason, simply joining the heating plate, the layout plate, and the outer circumferential wall may cause thermal fatigue to occur at the heating plate, the layout plate, and the outer circumferential wall themselves as well as at a joined portion thereof due to repetition of heating and cooling.

The present invention has been made in consideration of these circumstances, and an object of the present invention is to provide a combustion heater capable of suppressing thermal fatigue caused by repetition of heating and cooling.

Means for Solving the Problems

To accomplish the above object, a combustion heater of the present invention includes a heating plate, a layout plate disposed opposite to the heating plate, an annular outer circumferential wall interposed between the heating plate and the layout plate, clipping parts configured to sandwich the heating plate, the layout plate, and the outer circumferential wall so that at least one of the heating plate and the layout plate is allowed to expand in an extending direction thereof, a partition plate disposed between the heating plate and the layout plate, a combustion chamber disposed inside the outer circumferential wall along the outer circumferential wall, an inflow passage configured to flow fuel gas into the combustion chamber using the layout plate and the partition plate as a lateral wall thereof, and an outflow passage configured to discharge exhaust gas from the combustion chamber to an outside using the heating plate and the partition plate as a lateral wall thereof, and to preheat the fuel gas using heat from the exhaust gas via the partition plate.

The clipping parts may have flexibility.

The at least one of the heating plate and the layout plate may be allowed to slide relative to the clipping parts in their extending direction.

To accomplish the above object, another combustion heater of the present invention includes a heating plate, a layout plate disposed opposite to the heating plate, an annular outer circumferential wall interposed between the heating plate and the layout plate, a partition plate disposed between the heating plate and the layout plate, a combustion chamber disposed inside the outer circumferential wall along the outer circumferential wall, an inflow passage configured to flow fuel gas into the combustion chamber using the layout plate and the partition plate as a lateral wall thereof, and an outflow passage configured to discharge exhaust gas from the combustion chamber to an outside of the combustion heater using the heating plate and the partition plate as a lateral wall thereof, and to preheat the fuel gas using heat of the exhaust gas via the partition plate. Further, in the combustion heater, one of the heating plate and the layout plate is configured so that concave grooves are formed in a thickness direction of the heating plate and the layout plate so as to be equal in distance from the outer circumferential wall.

The grooves may be formed in opposite surfaces of one of the heating plate and the layout plate. In this case, the distance from the groove formed in one of the opposite surfaces to the outer circumferential wall may be different from the distance from the groove formed in the other surface to the outer circumferential wall.

The combustion heater may further include a first pipe part inserted into the inflow passage and configured to guide the fuel gas into the combustion heater, and a second pipe part disposed inside the first pipe part, inserted into the outflow passage, and configured to guide the exhaust gas out of the combustion heater and to preheat the fuel gas using the heat of the exhaust gas via the partition plate, wherein at least one of the pipe parts may include grooves which concave in a thickness direction of the pipe parts and formed in an outer circumference thereof.

Effects of the Invention

According to the combustion heater of the present invention, thermal fatigue caused by repetition of heating and cooling can be suppressed.

EMBODIMENTS FOR CARRYING OUT THE INVENTION

Hereinafter, exemplary embodiments of the present invention will be described in detail with reference to the attached drawings. Sizes, materials, other specific numerical values, and so on indicated in these embodiments are merely examples for facilitating comprehension of the invention, and unless indicated otherwise, the present invention is not limited thereto. Note that, in the specification and drawings, elements having substantially the same functions and constitutions will be given the same reference numerals, and duplicate descriptions thereof will be omitted here. Further, elements not directly related to the present invention are not illustrated in the drawings.

As described above, in the conventional combustion heater, the exhaust gas (the gas after combustion) having completed combustion is directly exhausted to the surroundings without being recovered. As a result, since the heat of the exhaust gas cannot be used, the thermal efficiency is low. Further, the temperature of the environment around the apparatus is raised by the heat of the exhaust gas, or the exhaust gas is permeated around the apparatus. As such, there is a need to take sufficient care to improve the environment.

In contrast, in the sealed combustion heater, the combustion chamber, the inflow passage of the fuel gas (the gas prior to combustion), and the outflow passage of the exhaust gas are formed inside the body container in a sealed state, and the fuel gas flowing through the inflow passage is preheated by the heat of the exhaust gas flowing through the outflow passage. Thereby, the excess enthalpy combustion is realized in the combustion chamber. In the sealed combustion heater, since the heat of the exhaust gas is recovered, the thermal efficiency is high. Since the exhaust gas itself is also recovered, the surrounding environment does not easily deteriorate. Further, since there is no need to form the fuel gas outlet in the radiating surface, the area of the radiating surface is not reduced, and the radiant intensity is high.

In this sealed combustion heater, a Swiss roll type or a disc type is proposed. In the Swiss roll type, the combustion chamber is formed in the center of the body container, and the inflow passage and the outflow passage are disposed in parallel in a spiral shape. In the Swiss roll type of combustion heater, since the shape is complicated, the manufacturing cost is high. In contrast, the disc type of combustion heater has a simple configuration in which a partition plate undertaking the heat transfer is made up of a flat plate smaller than a pair of flat plates (a heating plate and a layout plate) constituting the body container and in which the heating plate and the layout plate are disposed with an air gap provided therebetween, and performs heat exchange between the inflow passage and the outflow passage. Further, in the disc type of combustion heater, a shape of the heating plate having the radiating surface is not limited to an approximately circular shape as in the Swiss roll type, and the heating plate may be formed in an oval or rectangular shape according to the application. Furthermore, in the disc type of combustion heater, since the combustion chamber is disposed along the outer circumferential wall, the volume of the combustion chamber itself can be made greater than that of the Swiss roll type, and a combustion load factor (generated heat per unit area in the combustion chamber) can be suppressed. Instead of using the entire outer circumference taken along the outer circumferential wall as the combustion chamber, a part of the outer circumference may be used as the combustion chamber.

Incidentally, as described above, in the combustion heater, predetermined sealability for recovering the exhaust gas is required. For example, in the case of the disc type of combustion heater, it is necessary to secure the predetermined sealability so that the fuel gas and the exhaust gas do not leak out between the heating plate, the outer circumferential wall, and the layout plate that constitute the body container of the combustion heater.

However, when the heating plate and the layout plate are subjected to thermal expansion by the combustion heat, stress occurs at the heating plate, the layout plate, and the outer circumferential wall. As such, simply joining the heating plate, the layout plate, and the outer circumferential wall may cause thermal fatigue to occur at the heating plate, the layout plate, and the outer circumferential wall themselves as well as joined portions thereof due to repetition of heating and cooling.

Thus, the combustion heater 100 of the present embodiment is directed to suppress the thermal fatigue caused by repetition of the heating and cooling. Hereinafter, a detailed configuration of the combustion heater 100 capable of realizing such an object will be described.

First Embodiment

Combustion Heater 100

Figure 1:
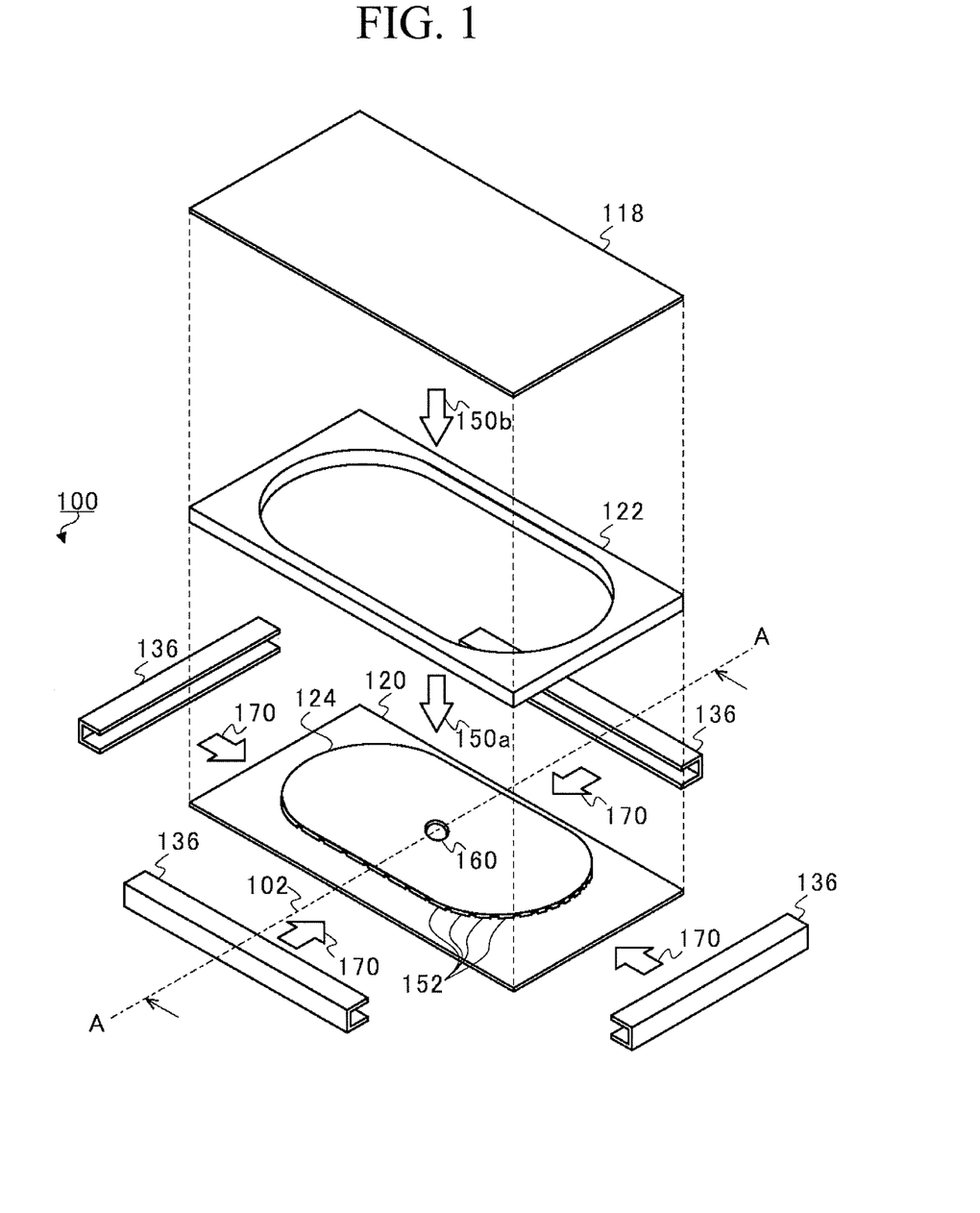
FIG. 1 is an assembled view for describing a structure of a combustion heater in a first embodiment of the present invention.
Figure 2A:
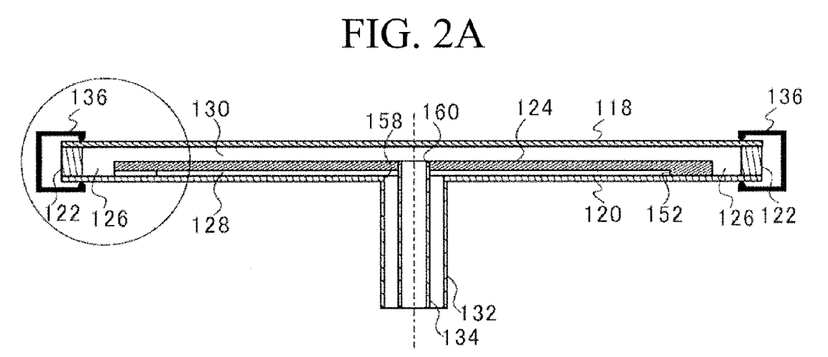
FIG. 2A is a cross-sectional view, taken along line A-A of FIG. 1, for describing the structure of the combustion heater in the first embodiment of the present invention.
Figure 2B:
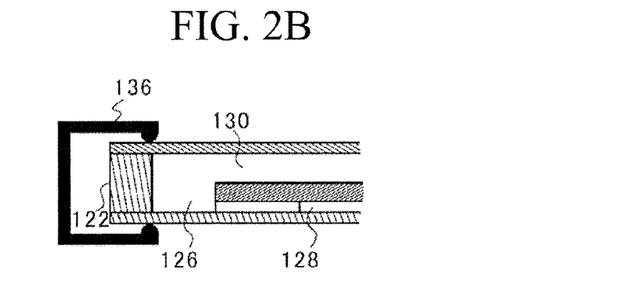
FIG. 2B is a partially enlarged view of FIG. 2A.

FIG. 1 is an assembled view for describing a structure of the combustion heater 100 in the first embodiment. Further, FIG. 2A is a cross-sectional view taken along line A-A of FIG. 1 for describing the structure of the combustion heater 100 in the first embodiment, and FIG. 2B is an enlarged view of a portion encircled with a circle in FIG. 2A. Here, FIG. 2A shows a cross section in the thickness direction of the combustion heater 100 at a portion depicted by a dotted and dashed line 102 of FIG. 1. As shown in FIG. 2A, the combustion heater 100 includes a heating plate 118, a layout plate 120, an outer circumferential wall 122, a partition plate 124, a combustion chamber 126, an inflow passage 128, an outflow passage 130, a first pipe part 132, a second pipe part 134, and clipping parts 136. In the present embodiment, the combustion heater 100 whose two-dimensional outline is about 220 mm×140 mm will be described as an example. However, the outline of the combustion heater 100 is not limited to such a size, and may be set to an arbitrary size.

The combustion heater 100 in the present embodiment is a premixed type in which fuel gas (premixed gas), in which municipal gas and air as an oxidant gas for combustion are premixed, is supplied to a body container. However, the combustion heater 100 at which the present invention targets is not limited to such a type, and may be a diffusion type in which the municipal gas and the air are mixed in the combustion chamber 126 or the inflow passage 128 immediately before the combustion chamber 126, and conduct diffusion combustion.

The heating plate 118 and the layout plate 120 are formed of a material whose heat resistance and oxidation resistance are high, for instance, ferrite-based stainless steel (SUS), or a material whose thermal conductivity is high, for instance, brass, and are disposed opposite to each other so as to be approximately parallel to each other (to be substantially parallel to cause the excess enthalpy combustion in the present embodiment). Further, the heating plate 118 and the layout plate 120 also function as a radiating body heated by the combustion heat generated by the combustion chamber 126. However, the layout plate 120 is not limited to the configuration functioning as the radiating body, and may also have, for instance, a heat-insulated structure.

When viewed from the top, the outer circumferential wall 122 has an annular shape in which an inner circumference thereof is formed in a track shape (a shape consisting of two approximately parallel segments and two arcs (semicircles) connecting the two segments) and in which an outer circumference thereof is formed in a rectangular shape. The outer circumferential wall 122 is interposed between the heating plate 118 and the layout plate 120. Further, an outer circumferential surface of the outer circumferential wall 122 may be used as the radiating surface.

The body container of the combustion heater 100 is made up of the outer circumferential wall 122, and the heating plate 118 and the layout plate 120 that close the outer circumferential wall 122 from the top and the bottom. In the body container, an area of the top and bottom wall surfaces thereof (outer surfaces of the heating plate 118 and the layout plate 120) is greater than that of an outer circumferential surface thereof (the outer circumferential surface of the outer circumferential wall 122). That is, the top and bottom wall surfaces occupy most of an outer surface of the body container. Of the top and bottom wall surfaces, for instance, the top-side surface (a top surface of the heating plate 118) becomes the radiating surface. When the fuel gas is burnt in the combustion chamber 126, first, the heating plate 118 is heated by such burning, and then heat is transferred from the radiating surface by radiation and convection of air. Thus, a heating target outside of the combustion heater 110 is heated. In the present embodiment, the top-side surface of the top and bottom wall surfaces (the top surface of the heating plate 118) is used as the radiating surface. However, the present embodiment is not limited to such a case. Only the bottom-side surface (a bottom surface of the layout plate 120) may be used as the radiating surface, or both of the top and bottom wall surfaces may be used as the radiating surface.

The partition plate 124 has a smaller outline than the heating plate 118 and the layout plate 120, and is formed in a shape taken along the inner circumferential surface of the outer circumferential wall 122. The partition plate 124 is interposed between the heating plate 118 and the layout plate 120 so as to be approximately parallel to the heating plate 118 and the layout plate 120. Between the partition plate 124 and the heating plate 118, and between the partition plate 124 and the layout plate 120, respective air gaps are formed. Further, the partition plate 124 is formed of a material whose heat resistance and oxidation resistance are high, for instance, ferrite-based stainless steel, or a material whose thermal conductivity is high, such as, for example, brass.

A positional relation of the heating plate 118, the layout plate 120, the outer circumferential wall 122, and the partition plate 124 will be described using FIG. 1. The partition plate 124 is disposed above the layout plate 120. As indicated by an arrow 150a, the outer circumferential wall 122 is superposed on the layout plate 120 so as not to overlap with the partition plate 124. In detail, as shown in FIG. 2A, the layout plate 120 is fixed to an end of the first pipe part 132, whereas the partition plate 124 is fixed to an end of the second pipe part 134 protruding above the first pipe part 132. The layout plate 120 and the partition plate 124 are spaced apart by a distance between the end of the first pipe part 132 and the end of the second pipe part 134. The partition plate 124 is disposed inside the outer circumferential wall 122. Here, between a lateral surface of the partition plate 124 and the cylindrical inner circumferential surface of the outer circumferential wall 122, an air gap is formed as the combustion chamber 126. Finally, as indicated by an arrow 150b, the heating plate 118 is superposed on the outer circumferential wall 122.

The combustion chamber 126 is surrounded by the outer circumferential wall 122, the heating plate 118, the layout plate 120, and an outer circumferential end of the partition plate 124, and is formed along the outer circumferential wall 122 further inside than the outer circumferential wall 122. Since the combustion chamber 126 is formed along the outer circumferential wall 122 in this way, the volume of the combustion chamber 126 can be sufficiently secured. Further, the combustion load factor can be reduced compared to that of the Swiss roll type. An ignition device (not shown) is installed at an arbitrary position of the combustion chamber 126.

As shown in 2A, the inflow passage 128 and the outflow passage 130 are superposed and formed in the body container in a thickness direction (a direction perpendicular to the top surface of the heating plate 118).

The inflow passage 128 is a space sandwiched between the layout plate 120 and the partition plate 124 using the layout plate 120 and the partition plate 124 as a lateral wall thereof. The fuel gas flowing into the center of the body container via the first pipe part 132 is radially guided to the combustion chamber 126 via the inflow passage 128.

The outflow passage 130 is a space sandwiched between the heating plate 118 and the partition plate 124 using the heating plate 118 and the partition plate 124 as a lateral wall thereof. The exhaust gas from the combustion chamber 126 is collected in the center of the body container via the outflow passage 130, and is guided out of the combustion heater 100 via the second pipe part 134. Further, as shown in FIG. 2A, since the inflow passage 128 and the outflow passage 130 are superposed and formed in the body container in the thickness direction, the heat of the exhaust gas can be transferred via the partition plate 124, thereby preheating the fuel gas.

The first pipe part 132 is connected to the inflow passage 128, and the fuel gas is guided into the combustion heater 100 via the first pipe part 132. Specifically, the layout plate 120 is provided with a hole 158 in a central portion thereof which has the same diameter as an inner diameter of the first pipe part 132, and the first pipe part 132 is connected to an inner circumferential portion of the hole 158.

The second pipe part 134 is disposed inside the first pipe part 132. That is, a dual pipe is formed by the first pipe part 132 and the second pipe part 134. Further, the second pipe part 134 is connected to the outflow passage 130, and the exhaust gas is guided out of the combustion heater 100 via the second pipe part 134. Specifically, the partition plate 124 is provided with a hole 160 in a central portion thereof which has the same diameter as an outer diameter of the second pipe part 134. The second pipe part 134 is connected to an inner circumferential portion of the hole 160. Furthermore, the second pipe part 134 also plays a role of transferring the heat of the exhaust gas, which flows along the interior thereof, to the fuel gas flowing along the first pipe part 132.

In the present embodiment, the second pipe part 134 is disposed inside the first pipe part 132. However, the present embodiment is not limited to such a case. The first pipe part 132 may be disposed inside the second pipe part 134, and the first pipe part 132 and the second pipe part 134 may also be connected to the inflow passage 128 and the outflow passage 130, respectively, from the side of the heating plate 118.

Figure 3:
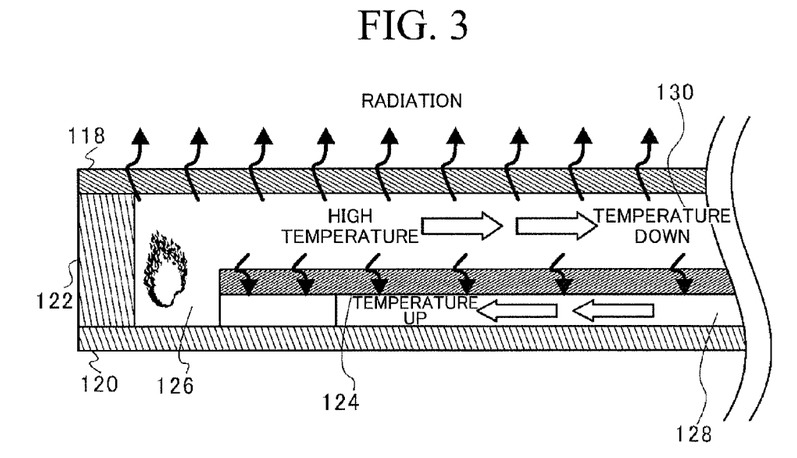
FIG. 3 is a view for describing preheating of fuel gas in the combustion heater.

Next, the flows of the fuel gas and the exhaust gas will be specifically described. FIG. 3 is a view for describing preheating of the fuel gas in the combustion heater 100. In FIG. 3, outlined arrows directed from the right to the left indicate the flow of the fuel gas, outlined arrows directed from the left to the right indicate the flow of the exhaust gas, and black arrows indicate movement of the heat. When the fuel gas is supplied to the first pipe part 132, the fuel gas flows from the central portion of the layout plate 120 into the inflow passage 128, and then toward the combustion chamber 126 while being radially spread in a horizontal direction. After the fuel gas is burnt to generate the heat in the combustion chamber 126, the fuel gas becomes the high-temperature exhaust gas. The exhaust gas flows from the combustion chamber 126 through the outflow passage 130 to the second pipe part 134.

The partition plate 124 is formed of a material that relatively easily transfers the heat. The heat of the exhaust gas passing through the outflow passage 130 is conducted to the fuel gas passing through the inflow passage 128 via the partition plate 124. In the present embodiment, the exhaust gas flowing along the outflow passage 130 and the fuel gas flowing along the inflow passage 128 become counterflows with the partition plate 124 located therebetween. As such, the fuel gas can be efficiently preheated by the heat of the exhaust gas, and high thermal efficiency can be obtained. Due to the so-called excess enthalpy combustion in which the fuel gas is burnt after being preheated, the combustion of the fuel gas can be stabilized, and the concentration of carbon monoxide (CO) generated by incomplete combustion can be suppressed to an extremely low concentration.

Furthermore, to enable the stable combustion in the combustion chamber 126, the connection between the inflow passage 128 and the combustion chamber 126 may be preferably configured so that a characteristic length thereof in a cross-sectional shape (hereinafter referred to as a "flow passage cross-sectional shape") perpendicular to the flow of the exhaust gas is set to be equal to or less than a quenching distance in consideration of the quenching distance (including a quenching equivalent diameter) sufficient to prevent flames from being introduced toward the inflow passage 128 (to prevent a combustion reaction from being propagated toward the inflow passage 128). Here, the characteristic length is a size decided by the cross-sectional shape of the flow passage just before the fuel gas flows into the combustion chamber 126. For example, when the flow passage cross-sectional shape is a circular shape, the characteristic length indicates the diameter of a circular cross section. When the flow passage cross-sectional shape is a shape other than the circular shape, the characteristic length indicates a waterpower equivalent diameter of a cross section. The waterpower equivalent diameter should be (4× flow passage cross-sectional area)/perimeter. The perimeter indicates a length of portions of the walls (layout plate 120 and the partition plate 124) with which the fuel gas is in contact in the flow passage cross section.

For example, if the distance between the layout plate 120 and the partition plate 124 is set to be equal to or less than the quenching distance, the flames are prevented from going into the inflow passage 128, and the combustion is stabilized. However, to uniformly make the distance between the layout plate 120 and the partition plate 124 so as to be equal to or less than the quenching distance, there is a need to increase surface accuracy and mounting accuracy of the layout plate 120 and the partition plate 124. Thus, in the present embodiment, to allow the distance between the layout plate 120 and the partition plate 124 to become greater than the quenching distance, a plurality of protrusions 152 that are in contact with the layout plate 120 are disposed around the combustion chamber 126 of the bottom surface of the partition plate 124 (the side of the layout plate 120) at predetermined intervals L.

Figure 4A:
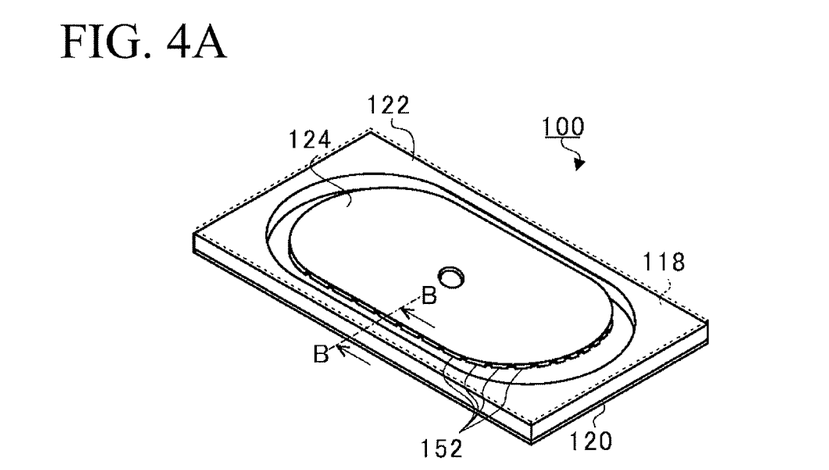
FIG. 4A is a perspective view of the combustion heater for describing a plurality of protrusions.
Figure 4B:
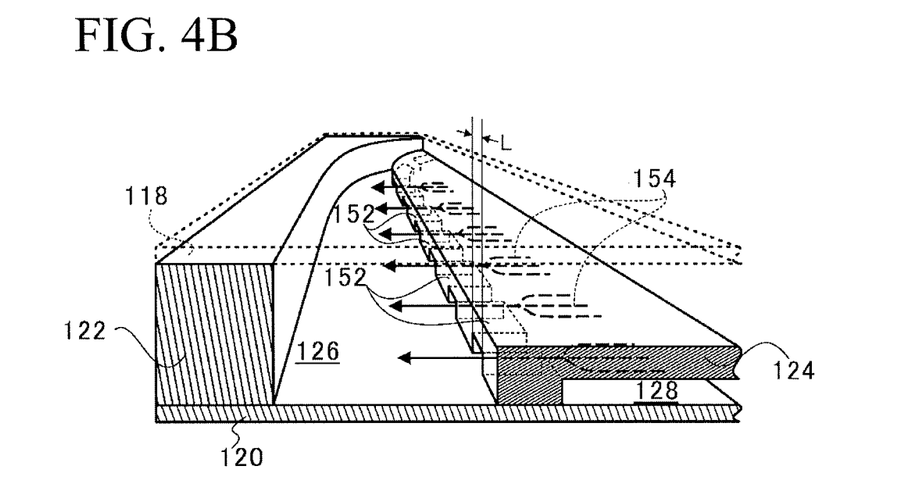
FIG. 4B is a cross-sectional view taken along line B-B of FIG. 4A for describing the plurality of protrusions.

FIGS. 4A and 4B are views for describing the plurality of protrusions 152. FIG. 4A is a perspective view of the combustion heater 100 in which the heating plate 118 indicated by a broken line is drawn in perspective, and FIG. 4B is a cross-sectional view in which a cross section taken along line B-B of FIG. 4A is viewed in an arrow direction. In FIG. 4B, to facilitate understanding of a structure of the plurality of protrusions 152, some of the protrusions 152 which are hidden with the partition plate 124 are indicated by broken lines. Further, an arrow 154 indicates a direction of the flow of the fuel gas. A flow passage cross section of the inflow passage 128 is narrowed by the plurality of protrusions 152 formed in the partition plate 124. As shown in FIGS. 2B and 4B, the fuel gas flows into the combustion chamber 126 through air gaps between the neighboring protrusions 152 within the inflow passage 128. Here, an interval L between the protrusions 152 becomes the characteristic length of the flow passage cross-sectional shape. That is, without strictly setting the distance between the layout plate 120 and the partition plate 124, the characteristic length of the flow passage cross-sectional shape can be set by the interval L.

Here, the quenching distance d of the fuel gas is represented by a size of a diameter of a pipe wall model, and is obtained by expression (1).

$$d = 2\lambda \cdot Nu^{1/2} / Cp \cdot \rho u \cdot Su \quad (1)$$

In expression (1), $\lambda$ is the thermal conductivity, Nu is the Nusselt number, Cp is the specific heat under constant pressure, $\rho u$ is the density of the fuel gas, and Su is the combustion speed.

The combustion heater 100 of the present embodiment is designed so that the above-mentioned characteristic length (the interval L between the protrusions 152) is equal to or less than the quenching distance d. As such, a stable combustion is made possible in the combustion chamber 126.

Further, without being limited to the configuration in which the plurality of protrusions 152 are provided, one annular protrusion may be provided around the combustion chamber 126 of the bottom surface of the partition plate 124. In this case, the distance between the protrusion and the layout plate 120 becomes the characteristic length. With such a configuration, the characteristic length of the inflow passage 128 can be made equal to or less than the quenching distance d by a simpler structure.

Furthermore, in the combustion heater 100 of the present embodiment, to suppress the thermal fatigue caused by the thermal expansion resulting from repetition of heating and cooling, the clipping parts 136 are provided. Such thermal expansion and an effect of the clipping parts 136 will be described using FIGS. 5A to 6D.

Figure 5A:
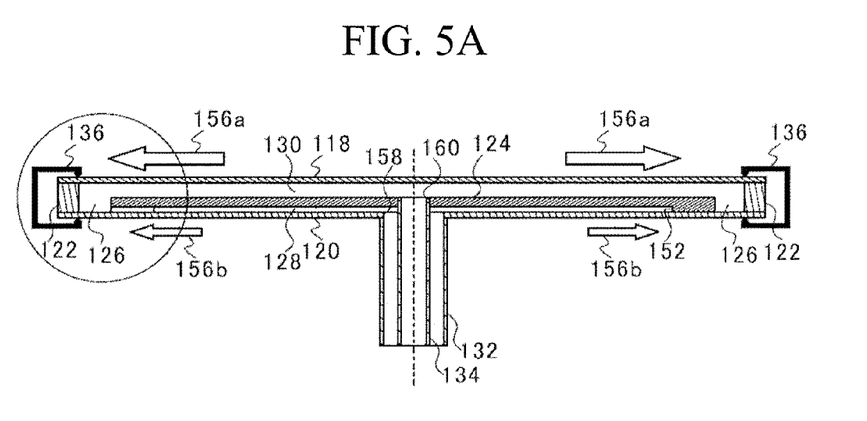
FIG. 5A is a cross-sectional view taken along line A-A of FIG. 1 for describing thermal expansion of the combustion heater.
Figure 5B:
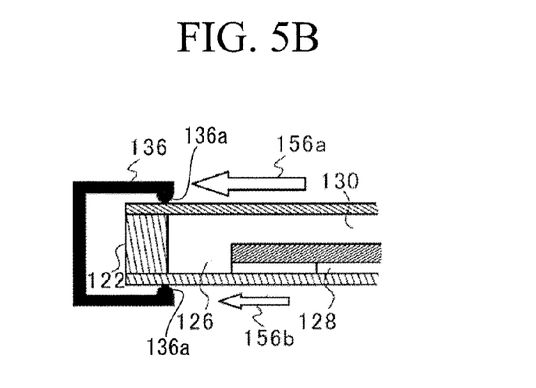
FIG. 5B is a partially enlarged view of FIG. 5A.

FIGS. 5A and 5B are views for describing thermal expansion of the combustion heater 100. FIG. 5A is a cross-sectional view taken along line A-A of the thickness direction of the combustion heater 100 at the portion indicated by the dotted and dashed line 102 of FIG. 1, and FIG. 5B is an enlarged view of a portion encircled by a circle of FIG. 5A. In the combustion heater 100, the heating plate 118 and the layout plate 120 are subjected to the thermal expansion by the combustion heat. Especially, the heating plate 118 has a higher temperature than the layout plate 120 in order to receive the heat of the exhaust gas after the combustion. Accordingly, the amount of deformation of the heating plate 118 which is caused by the thermal expansion (indicated by an outlined arrow 156a in FIG. 5) is greater than that of the layout plate 120 which is caused by the thermal expansion (indicated by an outlined arrow 156b in FIG. 5).

For this reason, when the heating plate 118 and the layout plate 120 are simply joined with the outer circumferential wall 122, stress caused by a difference in the thermal expansion is generated at interiors and joined portions of the heating plate 118, the layout plate 120, and the outer circumferential wall 122. Thus, by repeating the heating and cooling in the combustion heater 100, thermal fatigue may occur at the heating plate 118, the layout plate 120, and the outer circumferential wall 122 themselves and the joined portions thereof. Thus, in the combustion heater 100 in the present embodiment, the clipping parts 136 are provided to prevent the occurrence of the thermal fatigue.

As shown in FIGS. 1 and 5B, each clipping part 136 has a C-shaped cross-sectional shape, is formed of, for instance, a metal material, and sandwiches the heating plate 118, the layout plate 120, and the outer circumferential wall 122 from the top and bottom so that at least one of the heating plate 118 and the layout plate 120 can expand in a direction perpendicular to the outer circumferential wall 122. For example, the clipping part 136 is mounted on the heating plate 118, the layout plate 120, and the outer circumferential wall 122 in a direction of each arrow 170 shown in FIG. 1.

More specifically, in an example shown in FIG. 5B, opening-side front ends (portions indicated by numerals 136a in FIG. 5B) of the clipping part 136 having the C-shaped cross-sectional shape are bent in mutually approaching directions. Thus, when the clipping part 136 sandwiches the heating plate 118, the layout plate 120, and the outer circumferential wall 122, these bent front ends 136a come into close contact with the top surface of the heating plate 118 and the bottom surface of the layout plate 120, respectively. As a result, the sealability is secured at the outer circumference of the combustion heater 100, i.e., at a stacked portion of the heating plate 118, the layout plate 120, and the outer circumferential wall 122 that are covered by the clipping part 136.

In this case, the clipping part 136 does not obstruct the deformation of the heating plate 118, the layout plate 120, and the outer circumferential wall 122 which is caused by the thermal expansion in the direction perpendicular to the outer circumferential wall 122 indicated by the outlined arrows 156a and 156b in FIG. 5B.

The combustion heater 100 in the present embodiment structurally suppresses the stress caused by the thermal expansion by providing the clipping parts 136 securing the predetermined sealability required for the combustion heater 100 without joining the heating plate 118, the layout plate 120, and the outer circumferential wall 122. For this reason, the thermal fatigue of the combustion heater 100 which is caused by repetition of heating and cooling can be suppressed. The combustion heater 100 in the present embodiment can be used, for example, in a liquid because the space between the heating plate 118 and the outer circumferential wall 122 and between the layout plate 120 and the outer circumferential wall 122 is completely sealed. However, when used in air, the combustion heater 100 does not essentially require a completely sealed structure, and need only secure the predetermined sealability to guarantee desired efficiency.

Further, since the stress caused by the thermal expansion is suppressed, there is no need to impose restrictions on the surface shapes or materials of the heating plate 118 and the layout plate 120. As a result, materials whose emissivity is high (e.g. aluminum containing materials such as MSS HIB, NCA-1, and NCA-2) may be employed, and the radiant intensity can be further increased.

Furthermore, materials whose thermal conductivity is also high in addition to the emissivity (e.g., SiC ceramics) are employed. Thereby, the radiant intensity can be increased, and uniformity of the surface temperature can be increased.

Also, even in the layout plate 120, since there are no restrictions of the surface shape and material, heat loss can be suppressed using a material whose heat insulation is high.

Figure 6A:
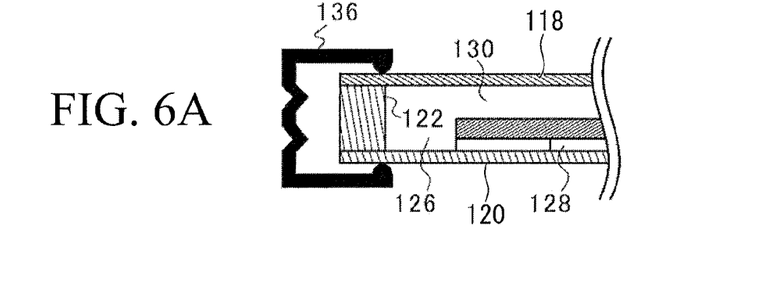
FIG. 6A is a cross-sectional view for describing a function of a clipping part.
Figure 6B:
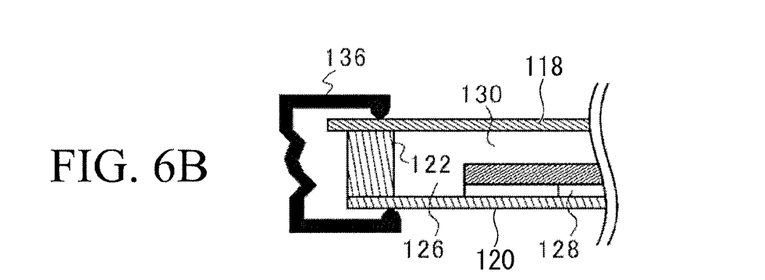
FIG. 6B is a cross-sectional view for describing the function of the clipping part.
Figure 6C:
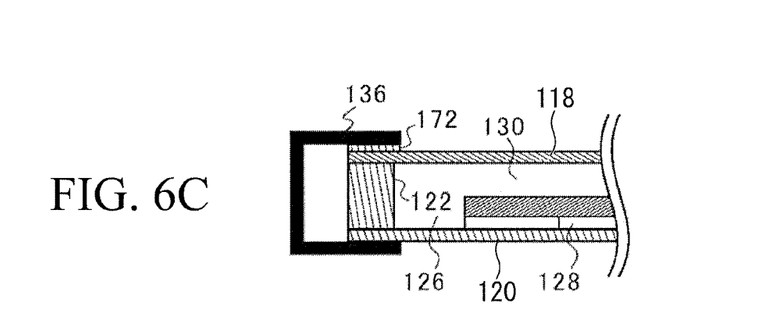
FIG. 6C is a cross-sectional view for describing the function of the clipping part.
Figure 6D:
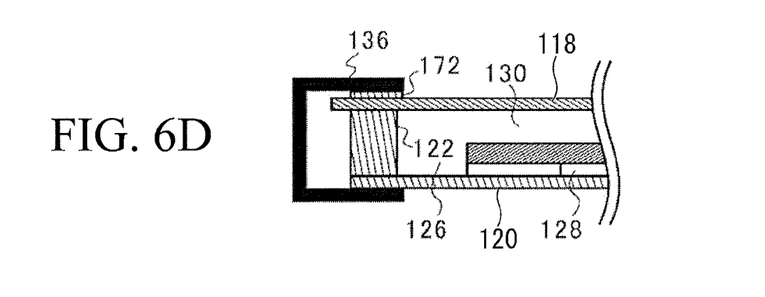
FIG. 6D is a cross-sectional view for describing the function of the clipping part.

FIGS. 6A to 6D are views for describing a function of the clipping part 136. FIG. 6A shows the clipping part 136 having flexibility before being deformed, and FIG. 6B shows the clipping part 136 having flexibility before deformation after being deformed. Further, FIG. 6C shows the clipping part 136 sandwiching the heating plate 118 and the layout plate 120 so that any of the plates can slide before sliding, and FIG. 6D shows the clipping part 136 sandwiching the heating plate 118 and the layout plate 120 so that any of the plates can slide after sliding. FIGS. 6A to 6D are enlarged views of a part of the cross-sectional view taken along line A-A of the combustion heater 100, similar to the partially enlarged view shown in FIG. 2B.

As shown in FIG. 6A, the clipping part 136 may be a structure or a material that has flexibility and that is subjected to elastic deformation depending on the thermal expansion of the heating plate 118 and the layout plate 120. The clipping part 136 having such a configuration sandwiches the heating plate 118, the layout plate 120, and the outer circumferential wall 122 from the top and bottom simply by junction of the heating plate 118 and the layout plate 120. For this reason, for example, when the heating plate 118 has a structure capable of sliding relative to the outer circumferential wall 122 via a sealing member such as a metal O ring in an extending direction (rightward/leftward direction in the figures) thereof, the deformation of the heating plate 118, the layout plate 120, and the outer circumferential wall 122 which is caused by the thermal expansion, can be absorbed easily as shown in FIG. 6B.

Further, as shown in FIG. 6C, at least one of the heating plate 118 and the layout plate 120 may be formed so as to be able to slide relative to the clipping part 136 via a lubricant. In FIG. 6C, the lubricant 172 of, for instance, molybdenum disulfide or graphite, is used between the clipping part 136 and the heating plate 118. Even here, for example, when the heating plate 118 and the outer circumferential wall 122 have a structure capable of sliding via a sealing member such as a metal O ring, the deformation of the heating plate 118, the layout plate 120, and the outer circumferential wall 122 which is caused by the thermal expansion can be absorbed as shown in FIG. 6D. Furthermore, the clipping part 136 is not limited to the material and structure in which the elastic deformation as in FIG. 6A is easy, and can increase heat insulation using, for instance, a material whose heat insulation is high.

In the combustion heater 100 described above, the thermal fatigue caused by repetition of heating and cooling can be suppressed.

Second Embodiment

In the first embodiment described above, the combustion heater 100 capable of suppressing the fatigue caused by the thermal expansion by providing the clipping parts 136 has been described. In the following second embodiment, the combustion heater capable of suppressing the thermal fatigue with only modified components rather than newly provided parts will be described.

(Combustion Heater 300)

FIGS. 7A to 9B are views for describing a structure of the combustion heater 300 in the second embodiment. Here, FIGS. 7A to 7D and FIGS. 9A and 9B are similar to FIG. 2, and show a cross section corresponding to the A-A cross section of the thickness direction in the portion of the dotted and dashed line 102 in FIG. 1. As shown in these figures, the combustion heater 300 includes a heating plate 118 and a layout plate 320, or a heating plate 318 and a layout plate 120, an outer circumferential wall 122, a partition plate 124, a combustion chamber 126, an inflow passage 128, an outflow passage 130, a first pipe part 132 (or a first pipe part 332 in FIG. 9B), and a second pipe part 134 (or a second pipe part 334 in FIG. 9A). Since the heating plate 118, the layout plate 120, the outer circumferential wall 122, the partition plate 124, the combustion chamber 126, the inflow passage 128, the outflow passage 130, the first pipe part 132, and the second pipe part 134 which have already been described as the components in the first embodiment have substantially the same functions as those of the first embodiment, a repeated description thereof will be omitted. Hereinafter, the heating plate 318 and the layout plate 320, configurations of which are different from those of the first embodiment, the first pipe part 332, and the second pipe part 334 will be described in detail.

Unlike the first embodiment, in the combustion heater 300 of the present embodiment, there are no clipping parts 136, and the heating plate 118 and the layout plate 320 (or the heating plate 318 and the layout plate 120) are simply joined with the outer circumferential wall 122.

As described in FIGS. 5A and 5B, to receive the heat of the exhaust gas after the combustion, the side of the heating plate 118 has a greater amount of deformation caused by the thermal expansion than the layout plate 120. As a result, the stress occurs at the interiors and joined portions of the heating plate 118, the layout plate 120, and the outer circumferential wall 122, and the thermal fatigue may be caused by repetition of heating and cooling. Thus, in the combustion heater 300, deformable configurations are employed in the heating plate 318 and the layout plate 320.

Figure 7A:
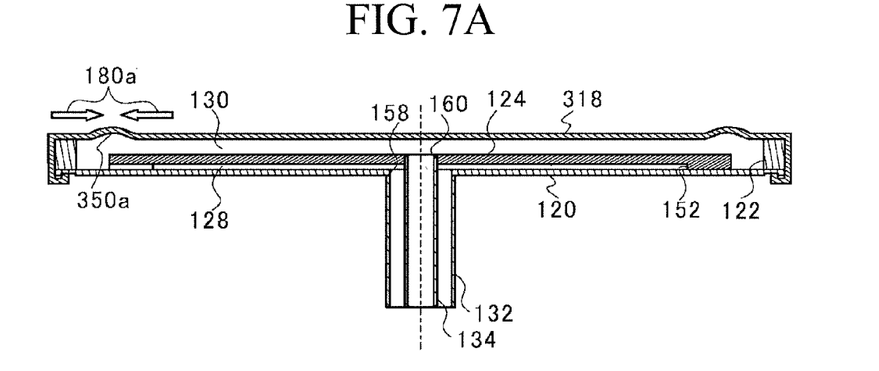
FIG. 7A is a cross-sectional view for describing a structure of a combustion heater in a second embodiment of the present invention.
Figure 7B:
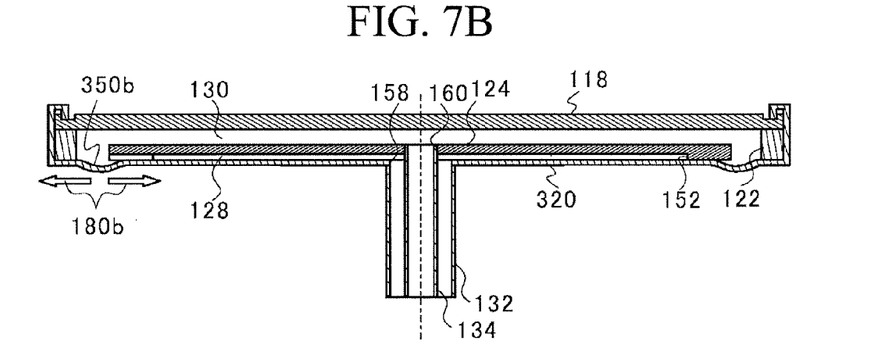
FIG. 7B is a cross-sectional view for describing the structure of the combustion heater in the second embodiment of the present invention.
Figure 8A:
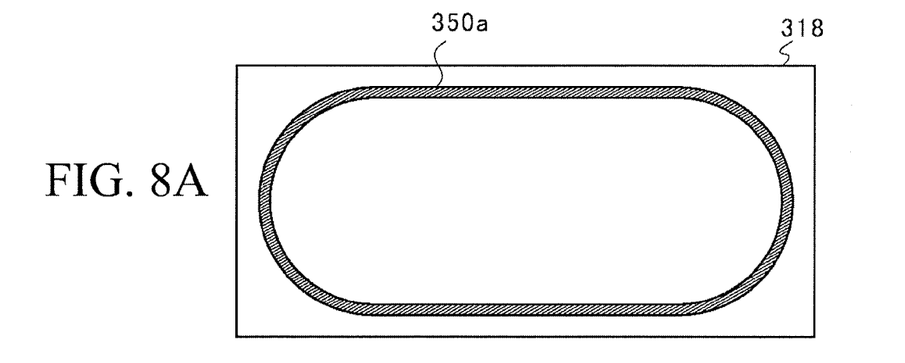
FIG. 8A is a plan view of a heating plate for describing the structure of the combustion heater in the second embodiment of the present invention.
Figure 8B:
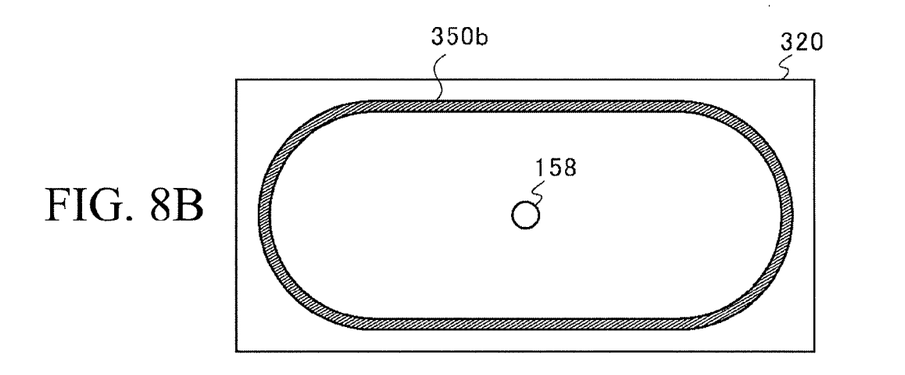
FIG. 8B is a plan view of a layout plate for describing the structure of the combustion heater in the second embodiment of the present invention.

As shown in FIGS. 7A and 7B, any one of the heating plate 318 and the layout plate 320 is configured so that concave grooves 350a and 350b are formed in a thickness direction (upward/downward direction in the figures) of the heating plate 318 and the layout plate 320, for instance, along the outer circumferential wall 122 so as to have the same distance from the outer circumferential wall 122. FIG. 8A shows a surface of the heating plate 318 in which the groove 350a is provided as shown in FIG. 7A, wherein the surface is located at a side on which the combustion chamber 126 and the outflow passage 130 are formed, and FIG. 8B shows a surface of the layout plate 320 in which the groove 350b is provided as shown in FIG. 7B, wherein the surface is located at a side on which the inflow passage 128 and the combustion chamber 126 are formed. As shown in FIGS. 8A and 8B, the concave grooves 350a and 350b in the thickness direction have a track shape, similar to the outer circumferential wall 122.

The heating plate 318 and the layout plate 320 in which such grooves 350a and 350b are provided easily undergo elastic deformation (expansion or contraction) in a direction perpendicular to the outer circumferential wall 122 (an extending direction of the heating plate 318 and the layout plate 320).

For this reason, for example, as shown in FIG. 7A, when the groove 350a is provided in the heating plate 318, the heating plate 318 has a greater amount of deformation caused by the thermal expansion than the layout plate 120. However, the difference in the amount of deformation is absorbed in such a way that the portion of the groove 350a is contracted in the directions perpendicular to the outer circumferential wall 122 (indicated by arrows 180a in FIG. 7A).

Further, as shown in FIG. 7B, when the groove 350b is provided in the layout plate 320, the heating plate 118 has a greater amount of deformation caused by the thermal expansion than the layout plate 320. However, the difference in the amount of deformation is absorbed in such a way that the portion of the groove 350b is contracted in the directions perpendicular to the outer circumferential wall 122 (indicated by arrows 180b in FIG. 7B).

In this way, the combustion heater 300 absorbs the difference in the amount of deformation, which is caused by a temperature difference between the heating plate 318 and the layout plate 320 and by a material difference between the heating plate 318 and the layout plate 320, using the grooves 350a and 350b. As such, the stress occurring at the coupled portion of the outer circumferential wall 122 is reduced. As a result, the thermal fatigue caused by repetition of heating and cooling can be suppressed. Especially, as shown in FIG. 7A, when the groove 350a is formed in the heating plate 318, the area of the radiating surface is increased, and thus the radiant intensity can also be increased.

Further, when the groove 350b is formed in the layout plate 320, the heating plate 318 is not subjected to the restrictions of shape caused by forming the groove. For this reason, as shown in FIG. 7B, for example, a thickness of the heating plate 318 can be increased. As a result, the uniformity of the surface temperature can be increased by the heat transfer. Furthermore, in comparison with the heating plate 318, the layout plate 320 has a low temperature. As such, the layout plate 320 in which the groove 350b is formed can highly maintain proof stress of the layout plate 320 undergoing the elastic deformation, and durability of the combustion heater 300 can be increased.

Figure 7C:
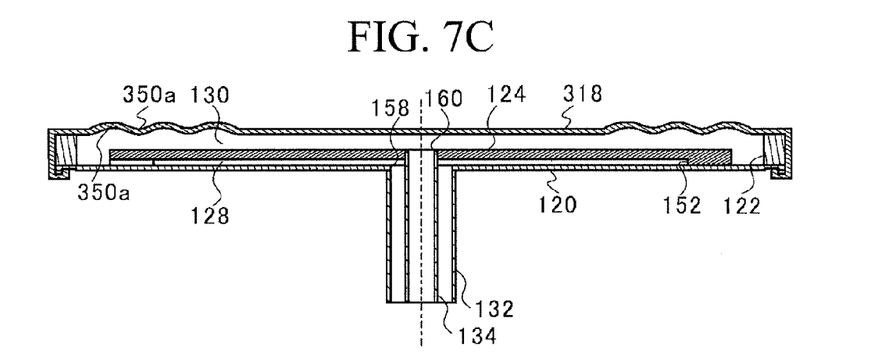
FIG. 7C is a cross-sectional view for describing the structure of the combustion heater in the second embodiment of the present invention.
Figure 8C:
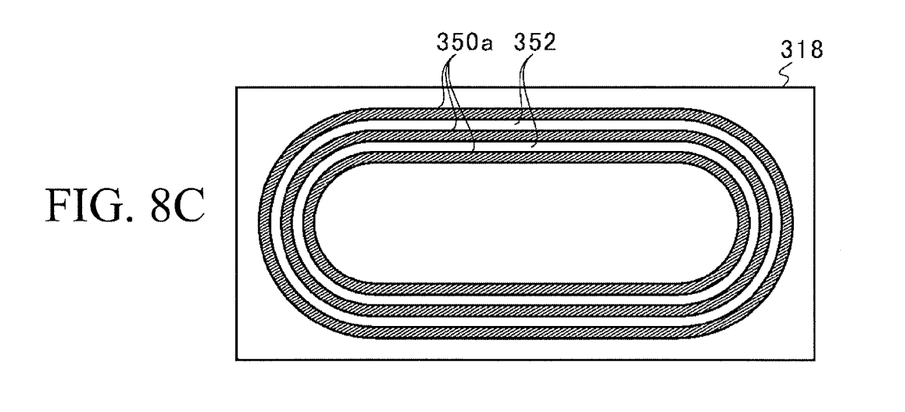
FIG. 8C is a plan view of the heating plate for describing the structure of the combustion heater in the second embodiment of the present invention.

Furthermore, as shown in FIG. 7C, the grooves 350a may be formed in opposite surfaces of the heating plate 318, and a distance of the grooves 350a, which are formed in one of the opposite surfaces, from the outer circumferential wall 122 may be made different from a distance of the grooves 350a, which are formed in the other surface, from the outer circumferential wall 122. FIG. 8C shows a surface of the heating plate 318 in which a plurality of grooves 350a are provided as shown in FIG. 7C, wherein the surface is located at a side on which the combustion chamber 126 and the outflow passage 130 are formed. As shown in FIG. 8C, the concave grooves 350a in the thickness direction have a track shape. Thus, at in-between positions 352 of the plurality of grooves 350a formed in the surface shown in FIG. 8C, the grooves 350a formed in the other surface (surface opposite to the surface shown in FIG. 8C) are located. Accordingly, as shown in FIG. 8C, a cross section going across the grooves 350a is undulately formed in a triangular waveform.

Further, similar to when the groove 350b is formed in the layout plate 320, the grooves 350b may be formed in opposite surfaces of the layout plate 320, and the distance of the grooves 350b, which are formed in one of the opposite surfaces, from the outer circumferential wall 122 may be made different from a distance of the grooves 350b, which are formed in the other surface, from the outer circumferential wall 122.

With the aforementioned configuration, the heating plate 318 and the layout plate 320 are more easily subjected to the elastic deformation, and the deformation of the heating plate 318 and the layout plate 320 which is caused by the thermal expansion can be further absorbed. Further, the grooves 350a and 350b are formed in the opposite surfaces so as to alternate each other. Thereby, plate materials of the heating plate 318 and the layout plate 320 can be made thin. As a result, press molding can be made easily during molding of the heating plate 318 and the layout plate 320, and the elastic deformation can be more easily performed during heating.

Further, in comparison with the first pipe part 132 and the second pipe part 134, the side of the second pipe part 134 passes the exhaust gas of higher temperature, and thus is greater than the first pipe part 132 with regard to the amount of deformation caused by the thermal expansion. For this reason, the stress occurs at the joined portions of the second pipe part 134, the layout plate 120, and the partition plate 124, and the thermal fatigue is easily caused by repeating the heating and the cooling.

Thus, in addition to the heating plate 318 and the layout plate 320, the second pipe part 334 may be formed with concave grooves 354a along an outer circumference thereof in a thickness direction thereof (a leftward/rightward direction in the figure).

Figure 9A:
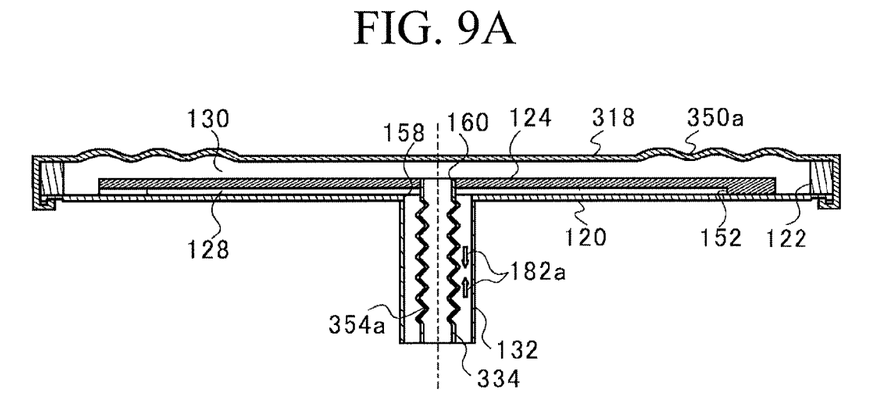
FIG. 9A is a cross-sectional view for describing the structure of the combustion heater in the second embodiment of the present invention.

As shown in FIG. 9A, due to the configuration in which the grooves 354a are formed in the second pipe part 334, the amount of deformation of the second pipe part 334 which is caused by thermal expansion can be absorbed in such a way that the portions of the grooves 354a are contracted in a lengthwise direction of the second pipe part 334 (indicated by arrows 182a in FIG. 9A). As a result, thermal fatigue of the second pipe part 334 which is caused by repeating heating and cooling can be suppressed. Further, by providing the grooves 354a, an area of a heat transfer portion from the second pipe part 334 to the first pipe part 132 is increased. Thus, the heat transfer is accelerated, and the thermal efficiency is increased. As a pipe having the grooves 354a, for example, an existing bellows is employed. Thereby, the manufacturing cost can be reduced compared to independent grooving.

Figure 9B:
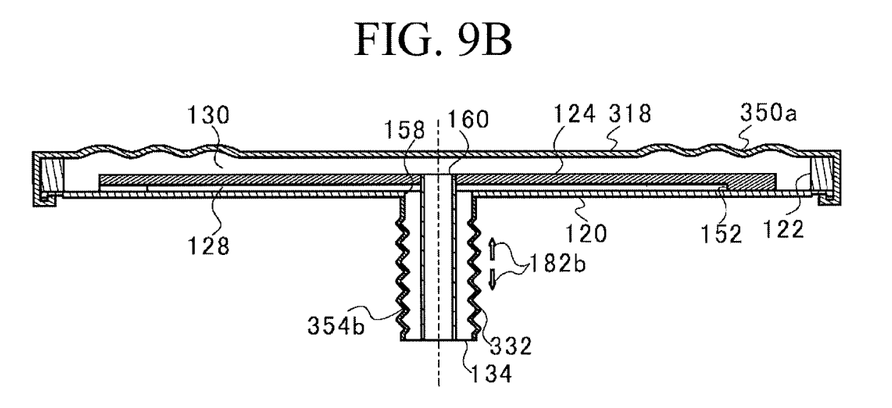
FIG. 9B is a cross-sectional view for describing the structure of the combustion heater in the second embodiment of the present invention.

Further, FIG. 9B shows a case in which, in place of the second pipe part 334, the first pipe part 332 is provided with concave grooves 354b along an outer circumference thereof in a thickness direction thereof (a leftward/rightward direction in the figure). As shown in FIG. 9B, even due to the configuration in which the grooves 354b are formed in the first pipe part 332, an amount of deformation of the second pipe part 334 which is caused by thermal expansion is absorbed in such a way that the portions of the grooves 354b expand in a lengthwise direction of the first pipe part 332 (indicated by arrows 182b in FIG. 9B). As a result, fatigue of the first pipe part 332 can be suppressed.

In the combustion heater 300 as described above, the thermal fatigue can be suppressed by repeating the heating and the cooling.

While the exemplary embodiments of the present invention have been described with reference to the attached drawings, the present invention is not limited to such embodiments, of course. It will be understood by those skilled in the art that various changes, additions, omissions, substitutions, and other modifications in configurations may be made therein without departing from the spirit and scope of the invention as defined by the appended claims, and it should be understood that they will naturally come under the technical scope of the present invention.

INDUSTRIAL APPLICABILITY

The present invention can be used for the combustion heater that burns fuel to heat a heating target.

DESCRIPTION OF REFERENCE NUMERALS 100, 300 . . . combustion heater, 118, 318 . . . heating plate, 120, 320 . . . layout plate, 122 . . . outer circumferential wall, 124 ... partition plate, 126 ... combustion chamber, 128 ... inflow passage, 130 ... outflow passage, 132, 332 ... first pipe part, 134, 334 ... second pipe part, 136 ... clipping part, 350 (350a, 350b), 354 (354a, 354b) ... groove

The invention claimed is:

1. A combustion heater comprising:
    a heating plate;
    a layout plate disposed opposite to the heating plate;
    an annular outer circumferential wall interposed between the heating plate and the layout plate;
    clipping parts configured to sandwich the heating plate, the layout plate, and the outer circumferential wall so that at least one of the heating plate and the layout plate is allowed to expand in an extending direction thereof;
    a partition plate disposed between the heating plate and the layout plate;
    a combustion chamber disposed inside the outer circumferential wall along the outer circumferential wall;
    an inflow passage configured to flow fuel gas into the combustion chamber using the layout plate and the partition plate as a lateral wall thereof; and
    an outflow passage configured to discharge exhaust gas from the combustion chamber to an outside using the heating plate and the partition plate as a lateral wall thereof, and to preheat the fuel gas using heat of the exhaust gas via the partition plate.

2. The combustion heater according to claim 1, wherein the clipping parts have flexibility.

3. The combustion heater according to claim 1, wherein the at least one of the heating plate and the layout plate is allowed to slide relative to the clipping parts in their extending direction.

4. The combustion heater according to claim 1, wherein the clipping part has a C-shaped cross-sectional shape having a first end portion and a second end portion, and is configured to sandwich the heating plate, the layout plate, and the outer circumferential wall by the first end portion of the clipping part coming into close contact with an outer surface of the heating plate and the second end portion of the clipping part coming into close contact with an outer surface of the layout plate to secure the sealability at a stacked portion of the heating plate, the layout plate, and the outer circumferential wall.

5. A combustion heater comprising:
    a heating plate;
    a layout plate disposed opposite to the heating plate;
    an annular outer circumferential wall interposed between the heating plate and the layout plate;
    a partition plate disposed between the heating plate and the layout plate;
    a combustion chamber disposed inside the outer circumferential wall along the outer circumferential wall;
    an inflow passage configured to flow fuel gas into the combustion chamber using the layout plate and the partition plate as a lateral wall thereof; and
    an outflow passage configured to discharge exhaust gas from the combustion chamber to an outside of the combustion heater using the heating plate and the partition plate as a lateral wall thereof, and to preheat the fuel gas using heat of the exhaust gas via the partition plate,
    wherein one of the heating plate and the layout plate is configured so that concave grooves are formed in a thickness direction of the heating plate or the layout plate so as to be equal in the distance from the outer circumferential wall.

6. The combustion heater according to claim 5, wherein the grooves are formed in opposite surfaces of one of the heating plate and the layout plate, and the distance from the groove formed in one of the opposite surfaces to the outer circumferential wall is different from the distance from the groove formed in the other surface to the outer circumferential wall.

7. The combustion heater according to claim 5, further comprising:
    a first pipe part inserted into the inflow passage and configured to guide the fuel gas into the combustion heater; and
    a second pipe part disposed inside the first pipe part, inserted into the outflow passage, and configured to guide the exhaust gas out of the combustion heater and to preheat the fuel gas using the heat of the exhaust gas via the partition plate,
    wherein at least one of the pipe parts includes grooves which concave in a thickness direction of the pipe parts and formed in an outer circumference thereof.

* * * * *